US008818850B2

(12) United States Patent
Valin et al.

(10) Patent No.: US 8,818,850 B2
(45) Date of Patent: Aug. 26, 2014

(54) METHOD AND PROCESS FOR REGISTRATION, CREATION AND MANAGEMENT OF CAMPAIGNS AND ADVERTISEMENTS IN A NETWORK SYSTEM

(75) Inventors: David Valin, Flushing, NY (US); Alex Socolof, Briarcliff Manor, NY (US)

(73) Assignee: Adopt Anything, Inc., Briarcliff Manor, NY (US)

( * ) Notice: Subject to any disclaimer, the term of this patent is extended or adjusted under 35 U.S.C. 154(b) by 174 days.

(21) Appl. No.: 13/171,746

(22) Filed: Jun. 29, 2011

(65) Prior Publication Data

US 2011/0258031 A1 Oct. 20, 2011

Related U.S. Application Data

(63) Continuation of application No. 12/459,353, filed on Jun. 29, 2009.

(51) Int. Cl.
*G06Q 30/00* (2012.01)
*G06Q 30/02* (2012.01)

(52) U.S. Cl.
CPC ........ *G06Q 30/0226* (2013.01); *G06Q 30/0231* (2013.01); *G06Q 30/0214* (2013.01); *G06Q 30/0207* (2013.01); *G06Q 30/0241* (2013.01)
USPC .................. 705/14.27; 705/14.39; 705/14.16; 705/14.1; 705/14.4

(58) Field of Classification Search
USPC ..................................................... 705/14.27
See application file for complete search history.

(56) References Cited

U.S. PATENT DOCUMENTS

| 2002/0103703 A1* | 8/2002 | Spetalnick ...................... 705/14 |
| 2002/0158129 A1* | 10/2002 | Hu ............................ 235/462.11 |
| 2008/0071640 A1* | 3/2008 | Nguyen ......................... 705/26 |
| 2009/0132656 A1* | 5/2009 | Ganz ............................ 709/205 |

OTHER PUBLICATIONS

Parry, "R U Ready 4 QR Codes?", MultiChannel Merchant, Oct. 1, 2008.*
Takanori, "Create QRcode barcode image with GD", CPAN, 2003, found on line at search.cpan.org/~kwitknr/GD-Barcode-1.15/Barcode/QRcode.pm.*

* cited by examiner

*Primary Examiner* — John G Weiss
*Assistant Examiner* — Scott C Anderson
(74) *Attorney, Agent, or Firm* — White-Welker & Welker, LLC; Matthew T. Welker, Esq.

(57) ABSTRACT

The presented invention is a method for an advertising sponsor user, using a client computer, or mobile device to be able to register, login and create zip code related local sponsor advertisements, with small advertisements for creating interest in the offers, that link to bigger advertisements with an embedded shopping cart. When a user creates the advertisements, they can upload their images, and create their type for the offers in the same interface form and the advertisements are instantly created and able to be published immediately throughout a network. Utilizing zip codes allows the system to use an intelligent smart decision engine, to make decisions of where advertisements and campaigns should be displayed as related to registered users locations. Also past performance and past advertisement information is utilized by the present invention to make appraisal value judgments as to the value of advertisements for sale, and campaign values for sale.

20 Claims, 21 Drawing Sheets

METHOD AND PROCESS FOR REGISTRATION, CREATION AND MANAGEMENT OF CAMPAIGNS AND ADVERTISEMENTS IN A NETWORK SYSTEM

CROSS REFERENCE TO RELATED APPLICATIONS

This application claims priority from and is a continuation of U.S. patent application Ser. No. 12/459,353, entitled "Method and mechanism for protection, sharing, storage, accessing, authentication, certification, attachment and tracking anything in an electronic network", filed on Jun. 29, 2009, which is incorporated by reference in its entirety for all purposes as if fully set forth herein.

SEQUENCE OR PROGRAM

Not Applicable

FEDERALLY SPONSORED RESEARCH

Not Applicable

TECHNICAL FIELD OF THE INVENTION

The present invention generally relates to a method, executed on a computer system, for the creation and management of campaigns and advertisements. More specifically the present invention relates to a method and process for registration, creation and management of campaigns and advertisements in a network system.

BACKGROUND OF THE INVENTION

In registration systems currently being used, information is submitted simply into a database without any additional activities at the time of registration. The present invention enables users to do multiple useful tasks at the onset of registration. The present invention further provides advertisers and businesses to connect to users, easily with these registration methods created. Commerce can be conducted between users, and campaigns benefit because a portion of advertisers revenues goes to designated campaigns, enabling everyone who participates to make money. The present invention creates bar codes at the time of registration that enable tracking and fulfillment of transactions.

DEFINITIONS

Unless stated to the contrary, for the purposes of the present disclosure, the following terms shall have the following definitions:

An advertisement creator module is defined as a software module that is engaged by a user through a computer or other equivalent electronic device to upload media such as images and video to create advertisements follow and predetermined process or protocol.

QR code module is an abbreviation for Quick response code. A QR code module is a specific matrix barcode (or two-dimensional code) that is readable by dedicated QR barcode readers and camera telephones. The code consists of black modules arranged in a square pattern on a white background. The information encoded may be text, URL, or other data. QR codes are automatically created by the QR code module when a user registers, and also are created when a user creates or uploads an advertisement to the system, and are also created when a user creates a campaign in the system, so that each user, advertisement and campaign has attached its own QR code, for use in the system. Also scan able data embedded for decoding in the QR code attached to Users, Advertisements and Campaigns can be changed for the purpose of marketing, relating information, and tracking as the user needs to change it with a QR code administration dashboard editor function.

Payment module is defined as software module that is engaged by a user through a computer or other equivalent electronic device to pay bills, pay other users, move funds from one registered users bank account or virtual bank account to another users bank account or virtual bank account, or to outside bank accounts.

A software module is defined as a series of process steps stored in an electronic memory of an electronic device and executed by the processor of an electronic device such as a computer, pad, smart phone, or other equivalent device known in the prior art.

A human key or human key module is defined as a collection of processor steps, within a computer server, and/or networked to other computer servers, that processes, facial and voice data, in a method where a person looking at the cam and talking or saying a phrase is identified, in a computer that work in real time to store and cross reference data for identification and security, as related to using an individual unique human being as a user name, password, or any other unique identifier of that unique human being, a Human Key can be attached to and/or substituted for QR code uses throughout the invention.

A quick view creator and viewer module is defined as a campaign and advertisement creation tool for making campaigns and advertisements that can be completely displayed, viewed and understood in a very short amount of time by the user. Utilizing an upload function that takes images, audio, text and assembles them together in a collage of a representation, and additionally where the text is converted to speech, for making it easy for a user to see and understand a campaign or advertisement in a short period of time.

A make an offer module is defined as a component where a user can create or make an offer for products, and/or services, on advertisements, campaigns, or embedded in QR codes revealed when scanned by device.

A search engine module is used for searching campaigns as related to advertisements, and QR code incentives, where a user can search for a product or service that they need, and can see what campaigns will benefit from the purchase, and at the same time what QR code offers are related, to the campaign and the advertisement, and what the QR Code pass along benefit will be if the user passes the QR Code off to their friends.

SUMMARY OF THE INVENTION

The presented invention is a method for an advertising sponsor user, using a client computer, or mobile device to be able to register, login and create zip code related local sponsor advertisements, with small advertisements for creating interest in the offers, that link to bigger advertisements with an embedded shopping cart. When a user creates the advertisements, they can upload their images, and create their type for the offers in the same interface form and the advertisements are instantly created and able to be published immediately throughout a network.

Utilizing zip codes allows the system to use an intelligent smart decision engine, to make decisions of where advertisements and campaigns should be displayed as related to registered users locations for marketing and targeting. Also past performance and past advertisement information is utilized by the present invention to make appraisal value judgments as to the value of advertisements for sale, and campaign values for sale.

When a user creates campaigns a real bank account and a virtual bank account is created with credit card, debit card, coupon and/or voucher payments connected to the user account and a financial institution of their choosing, or designated financial institution by the system.

All transactions from the advertisements are associated with bar codes that are in the possession of the merchant business, which can be scanned at point of purchase. The accounting and discounts are automatically applied to the incentive management system in the main invention server location. By having advertisements linked to embedded shopping carts the users can purchase new or used items, products or services and can lock in coupons, offers and discounts for future uses and merchant location fulfillments.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

In the following detailed description, reference will be made to the accompanying drawings, in which identical functional elements are designated with like numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

Figure 1:
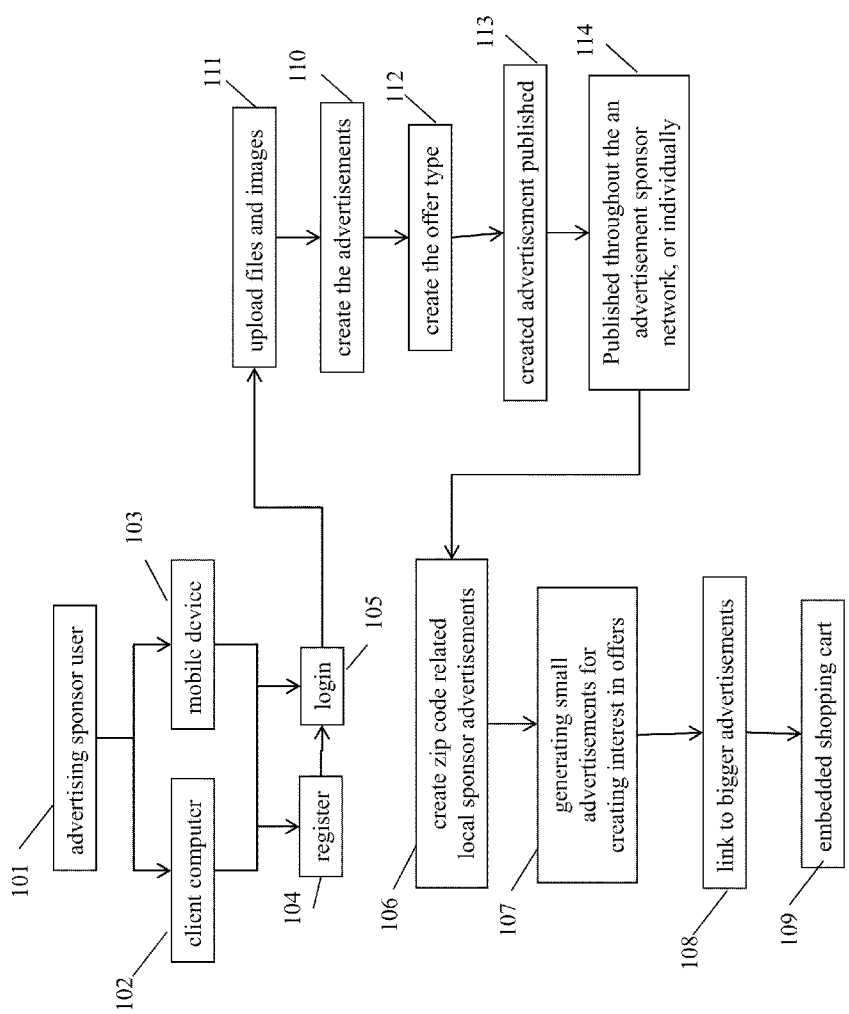
FIG. 1 is a flow chart illustrating the method of advertising taught by the present invention.

The current present invention is a method for an advertising sponsor user 101, using a client computer 102, or mobile device 103 to be able to register 104, login 105, and create zip code related local sponsor advertisements 106, with small advertisements for creating interest in offers 107, that link to bigger advertisements 108 with embedded shopping cart 109 as shown in FIG. 1. Another aspect of the invention is that when a user creates the advertisements 108, they can upload their images 110, and create their type for the offers 111 in the same interface form, and the advertisements 108 are instantly created and able to be published 112 immediately throughout the an advertisement sponsor network, or can be individually 113. By having advertisements linking to shopping carts embedded the users can purchase new or used items, products or services and can lock in coupons, offers and discounts for future uses and merchant location fulfillments.

Figure 2:
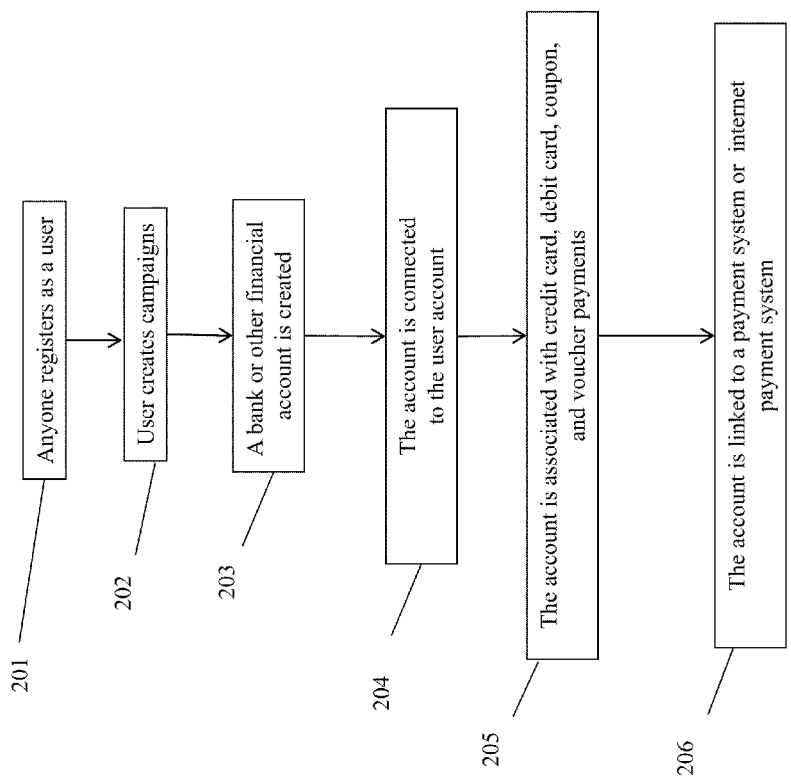
FIG. 2 is a flow chart illustrating the registration process taught by the present invention.

Another aspect of the method, as shown in FIG. 2, involves where when anyone registers as a user 201 and creates campaigns 202 a bank or other financial account is created 203 and associated with the registered user 201. The bank or financial account 203 is associated with credit card, debit card, coupon, and voucher payments 204 and connected to the user account 205 and linked to a payment system or internet payment system 206.

Figure 3:
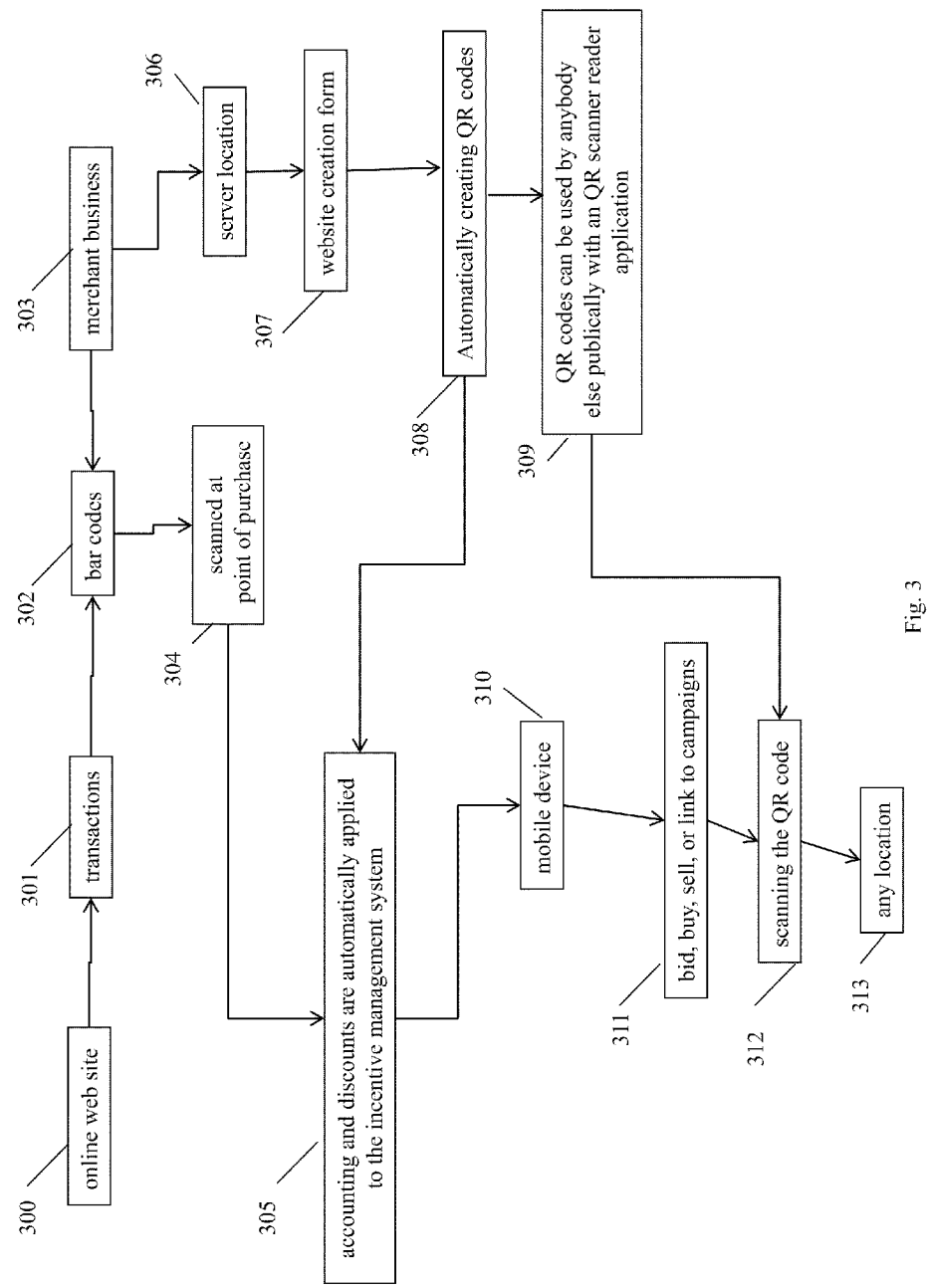
FIG. 3 is a flow chart illustrating the fulfillment process taught by the present invention.

Now referring to FIG. 3, another aspect of the present invention is related to the fulfillment of incentives and offers, as related to businesses and conversions through an online web site 300. The present invention handles these transactions 301 with bar codes 302 that are in the possession of the merchant business 303 that can be scanned at point of purchase 304 and the accounting and discounts are automatically applied to the incentive management system 305 in the main invention server location 306. A website creation form 307 is provided for automatically creating QR codes 308 for each registered user 309. QR codes 308 can be used by anybody else publically with an QR scanner reader application 309 installed on their mobile device 310, to bid, buy, sell, or link to campaigns 311, by just scanning 312 the QR code 308 at any location 313.

Figure 4:
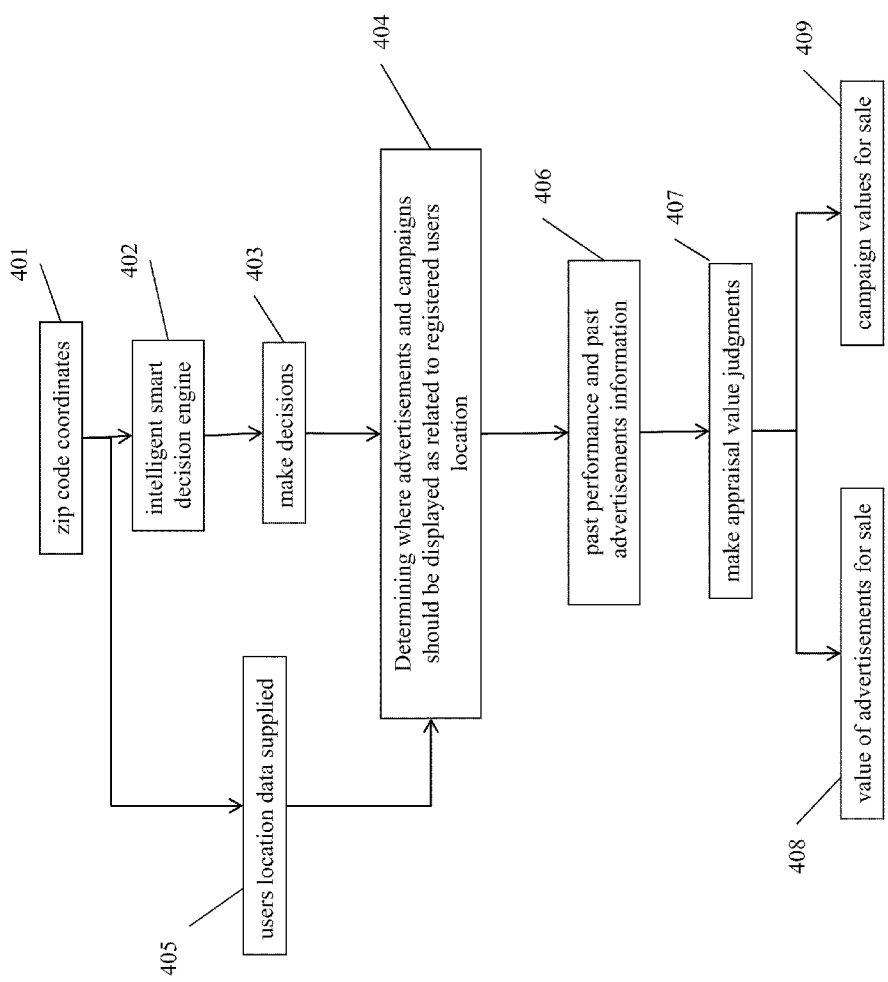
FIG. 4 is a flow chart illustrating the intelligent smart decision engine taught by the present invention.

Now referring to FIG. 4, by utilizing zip code coordinates 401 the method can use an intelligent smart decision engine 402, to make decisions 403 of where advertisements and campaigns 404 should be displayed as related to registered users location data supplied 405. Also past performance and past advertisements information 406 is utilized by the invention process to make appraisal value judgments 407 as to the value of advertisements for sale 408 and campaign values for sale 409.

Figure 5:
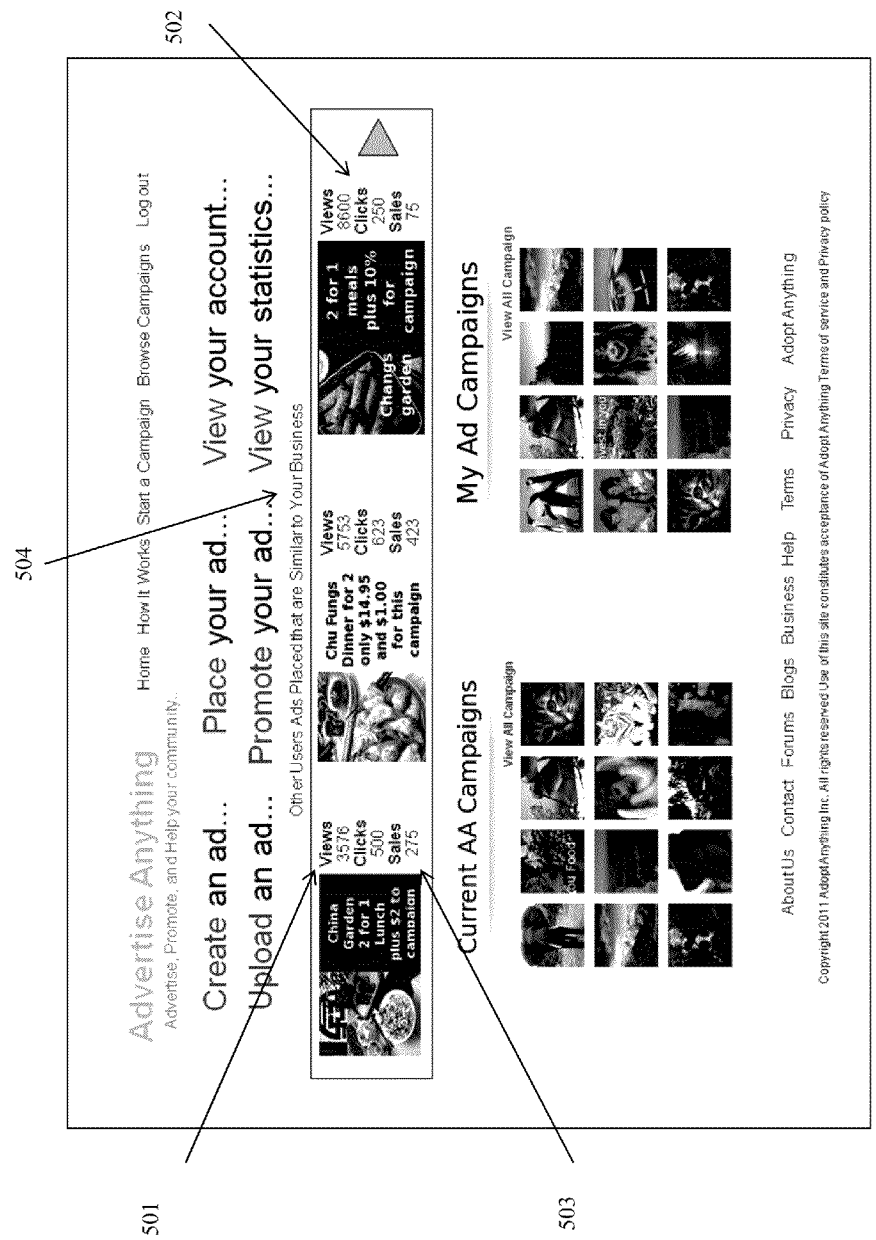
FIG. 5 illustrates the statistics generated by the present invention.

Statistics such as how many views 501, click through fulfillment 502, and actual purchasers 503 are also aggregated in the method to allow users to be able to make better decisions, and campaigns to benefit from transactions generated from advertisements in the system. As shown in FIG. 5, these statistics illustrate similarities such as "other user ads placed that are similar to your business" 504.

Figure 6:
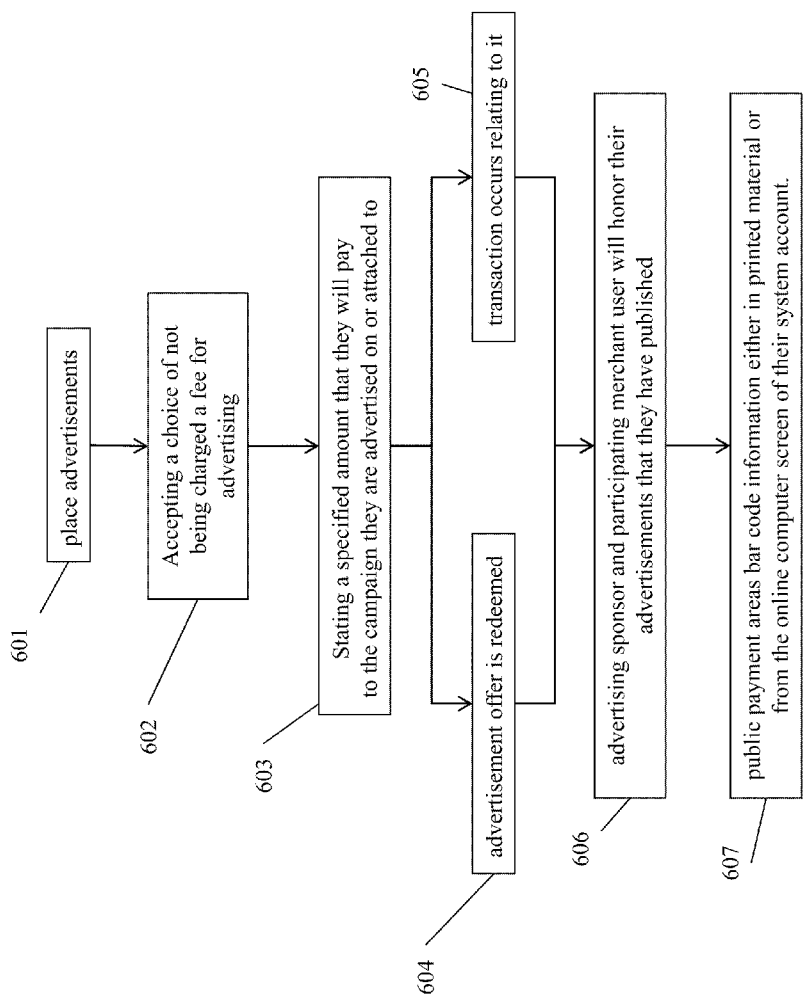
FIGS. 6 and 7 illustrate the bid for advertisement placement method taught by the present invention.

Now referring to FIG. 6, another aspect of the invention is that users that place advertisements throughout the method 601, are offered a choice of not being charged a fee for advertising 602, but are required to state a specified amount 603 as little as 25 cents that they will pay to the campaign they are advertised on or attached to, if their advertisement offer is redeemed 604 or a transaction occurs relating to it 605 and that the advertising sponsor and participating merchant user 606 will honor their advertisements that they have published and present at public payment areas bar code information either in printed material or from the online computer screen of their system account 607.

Figure 7:
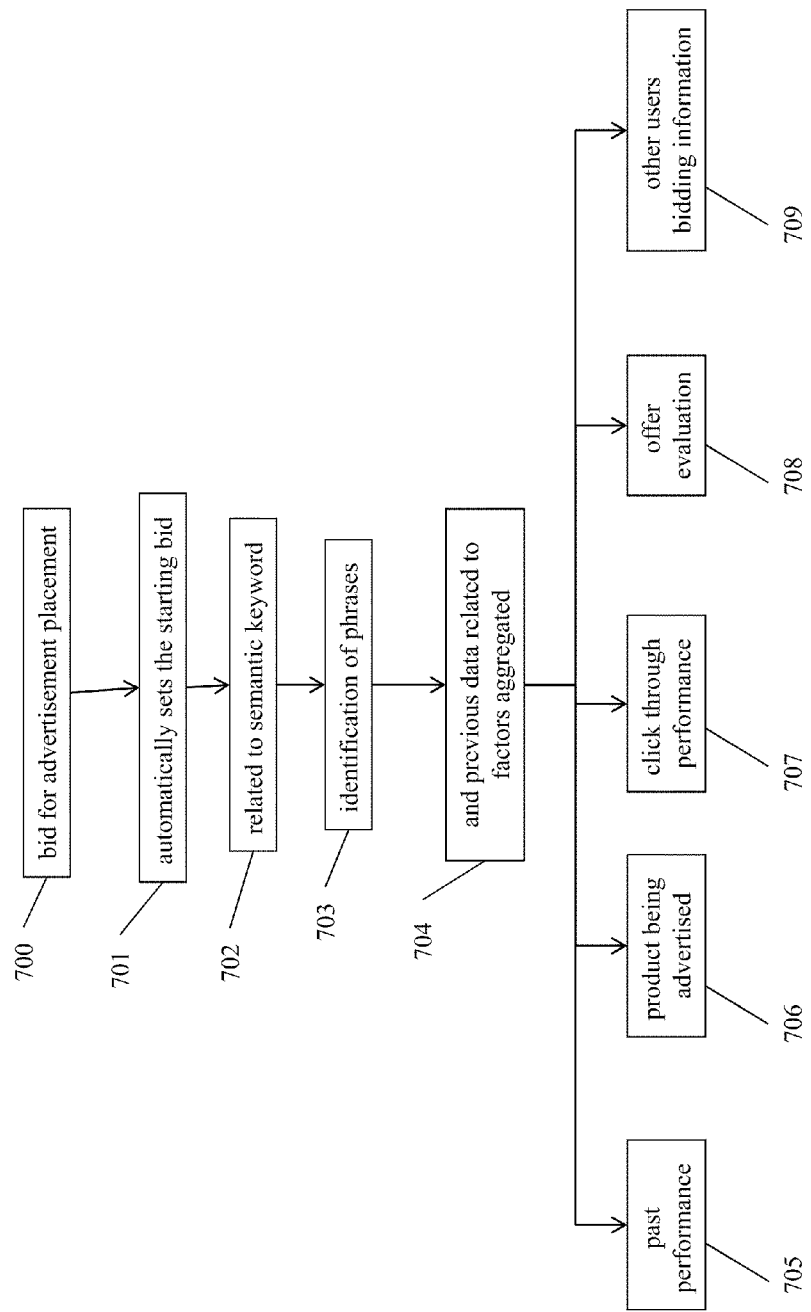

Another aspect of the invention is the bid for advertisement placement 700 in the advertisement network as shown in FIG. 7, that automatically sets the starting bid 701 as related to semantic keyword 702, identification of phrases 703, and previous data related to factors aggregated 704 such as, past performance 705, product being advertised 706, click through performance 707, offer evaluation 708, and other users bidding information 709.

Figure 8:
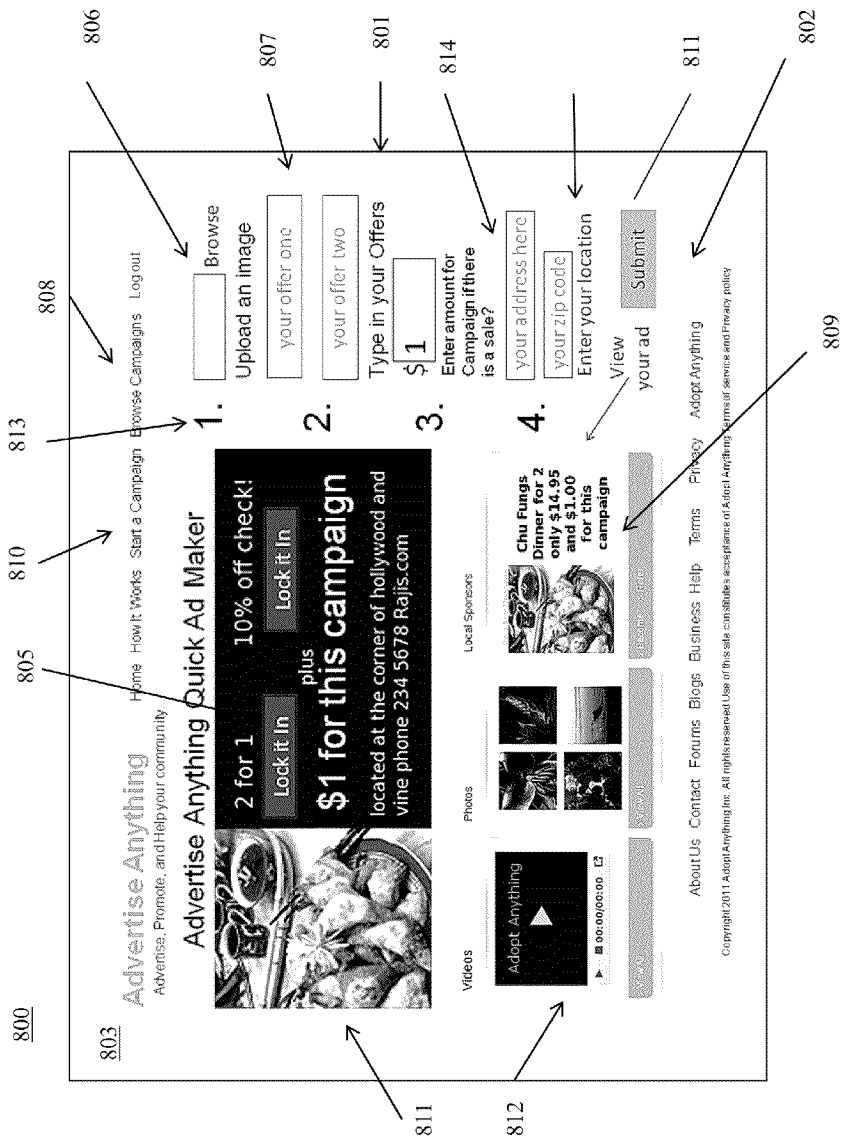
FIG. 8 is a flow chart illustrating the a user advertising creator module of the present invention.

The present invention teaches a user advertising creator module as shown in FIG. 8. An automated machine advertising creator system 800 is comprised of an administration advertising creator system 801 that is embedded into a campaign system 802, or can be run independently on websites 803 or in mobile or static applications 804 that allows uploads 813 with protected intellectual property registration utilizing attachment and encoding intellectual property to the Human Key, and/or a QR code, as a reference for tracking and identification 814. There are multiple functions for taking orders 805, uploading advertisement images 806, adding text advertisements and information 807, tracking views and clicks through to offers 808, and links on a website 809, enabling advertisements to be connected to users' campaigns 810, and that sales or transactions from advertisements, must benefit a designated campaign 811 or plurality of campaigns 812.

Figure 19:
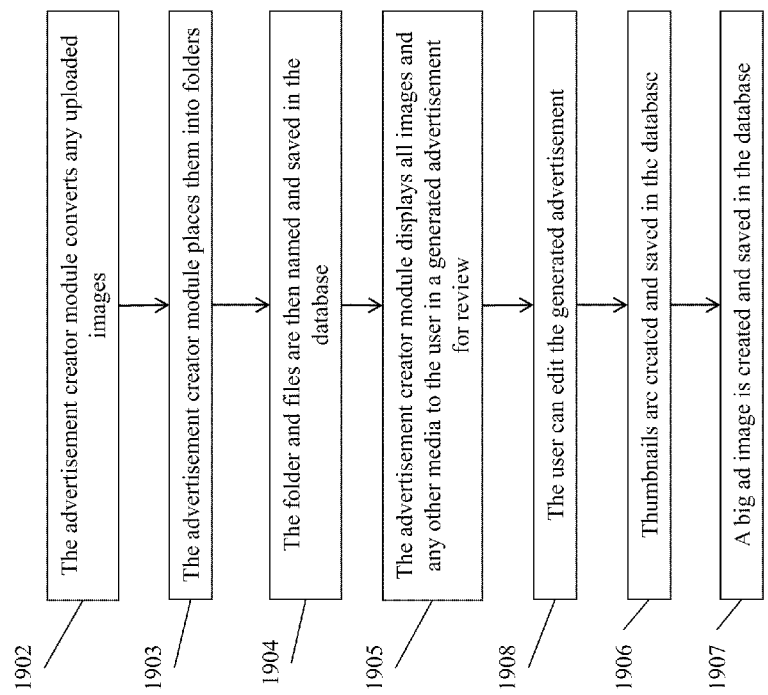
FIG. 19 illustrates the advertisement creator module in more detail.

Now referring to FIG. 19, the advertisement creator module is illustrated in more detail. The advertisement creation module present the user with a display form 1901 for browsing their location machine or linking to website for uploading of images, video, or other media. The advertisement creator module then converts any uploaded images 1902 and places them into folders 1903, the folder and files are then named and saved in the database 1904. Next the advertisement creator module displays all images and any other media to the user in a generated advertisement for review 1905. The user can edit the generated advertisement. Once the generated advertisement is saved thumbnails 1906 are created and saved in the database 1904 in addition to a big ad image 1907 being created and saved in the database 1904.

Figure 9:
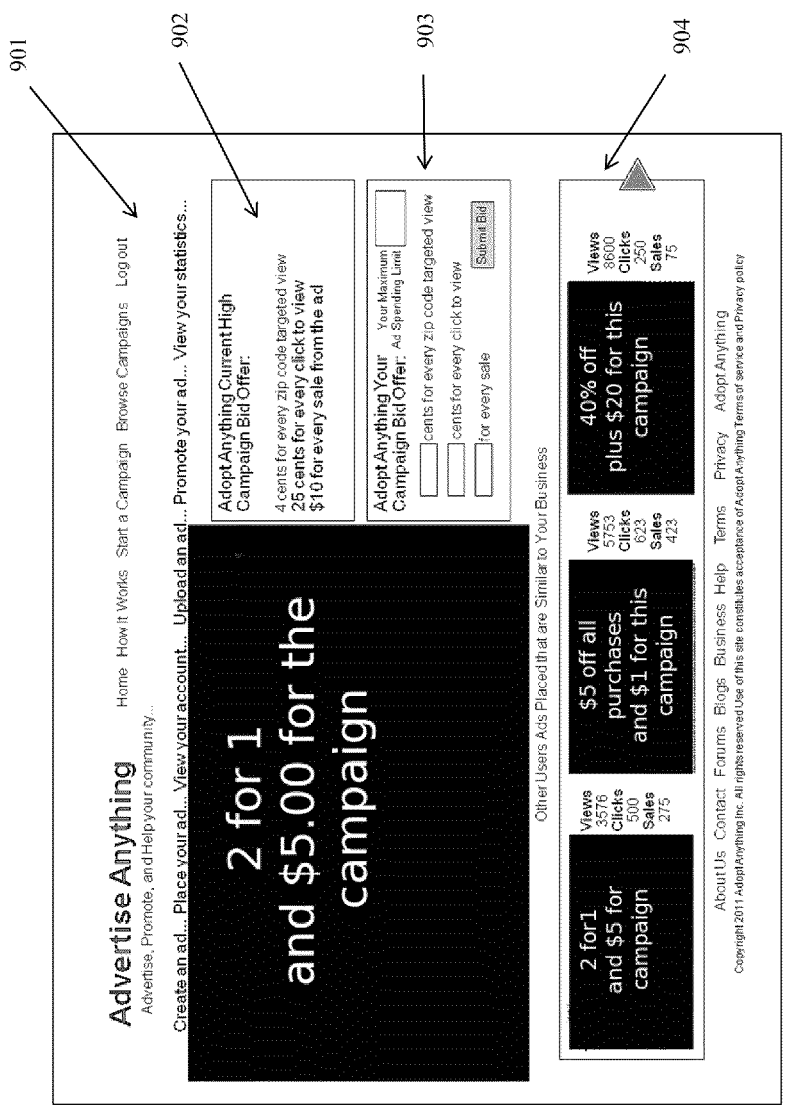
FIG. 9 is a flow chart illustrating the advertising creator function.

Users can have combinations of user advertisements rotated in a composite formation area 901, and these combinations of users advertisements 902 can be searched in a cluster of advertisements with relationships to the primary subject of the advertisements 903, with similarity of interested searches combined with request and smart relationship functions for products, services, and information 904, and an advertising creator function connected to the advertising placement system, connects campaign donations for the purpose of creating revenue, and interest in campaign related subjects, including shared percentages, and defined amounts of money and discounts with campaign users, creators, and beneficiaries as shown in FIG. 9.

Figure 10:
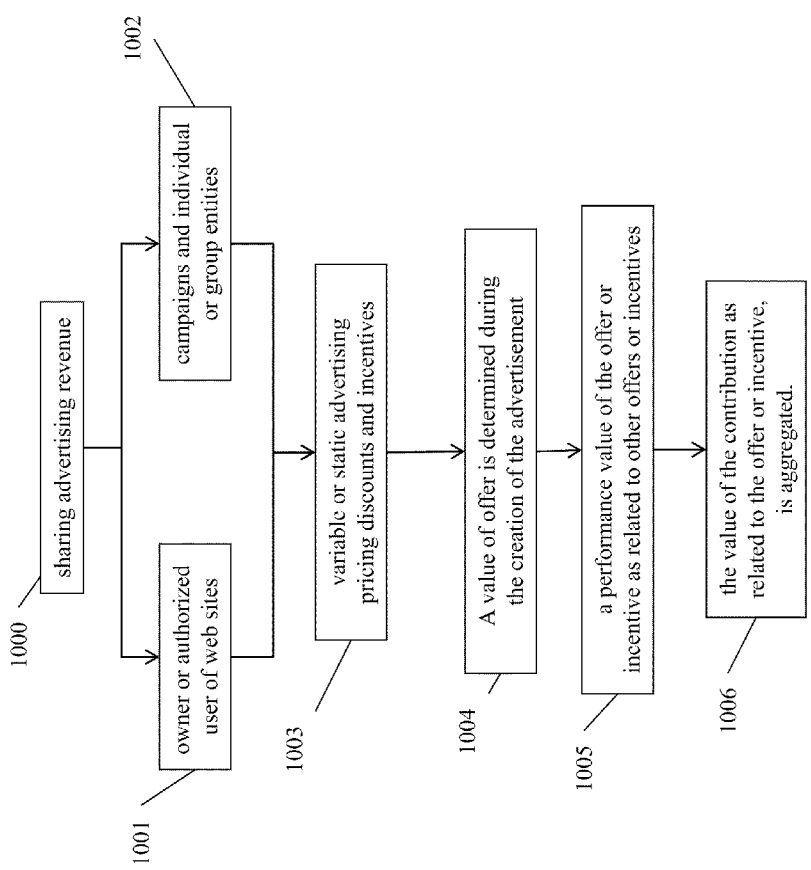
FIG. 10 is a flow chart illustrating the revenue process of the present invention.

Now referring to FIG. 10, the method teaches sharing advertising revenue 1000 with the owner or authorized user of web sites 1001, campaigns and individual or group entities 1002, with variable or static advertising pricing discounts and incentives 1003. A value of offer is determined during the creation of the advertisement 1004, with a performance value of the offer or incentive as related to other offers or incentives 1005, also the value of the contribution as related to the offer or incentive, is aggregated 1006. Advertisements are free, but the offer has to be included in the advertisement, and the contribution offer additionally has to be included either in print, video, image, or audio in the advertisement. All incentives are evaluated, classified, and stored for later reference, and attached, tracked, and solicited to donation, personal, or informational campaigns. An additional feature of the method is that bank accounts, credit cards, printed coupons vouchers and debit cards accounts are created at the time of registration, advertising and campaign creation as previously discussed, with debit and credit cards incentives attached to cash discounts at the point of purchase or point of sale.

Figure 11:
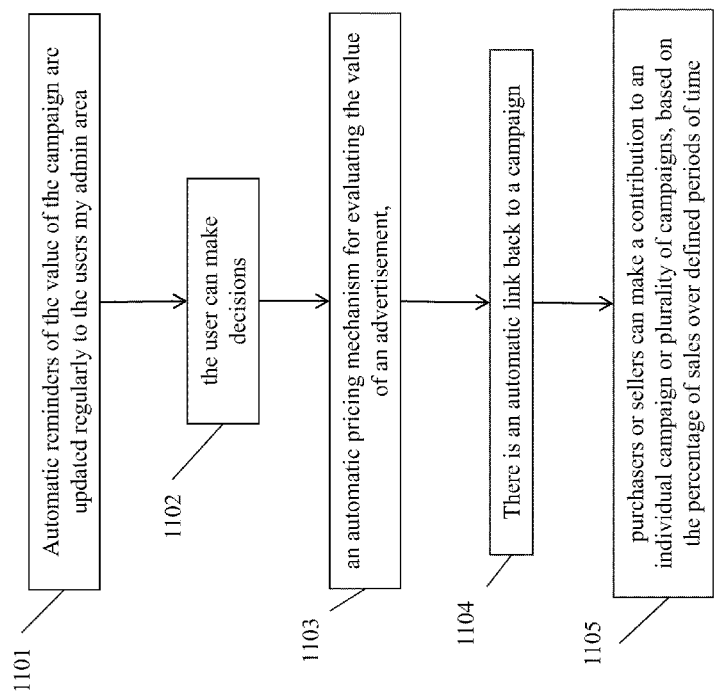
FIG. 11 is a flow chart illustrating the automatic features of the present invention.

The method provides for matching contributions combined with advertisement and donations, with automatic pricing for evaluating the value of a campaign, for resale if the user chooses as shown in FIG. 11. Automatic reminders of the value of the campaign are updated regularly to the users my admin area 1101, so the user can make decisions 1102, as well there is an automatic pricing for evaluating the value of an advertisement, for resale, with the same updates reminders as the campaigns system 1103. There is an automatic link 1104 back to a campaign where any single or plurality of vendors, purchasers or sellers can make a contribution to an individual campaign or plurality of campaigns 1105, based on the percentage of sales over defined periods of time, and users can vote on where or which campaign they want proceeds to go to the method also includes a search engine for searching, and display of advertisement offers as related to donations, services, businesses, personal and campaigns utilizing, automated semantic keyword sorting and related subjects.

Figure 12:
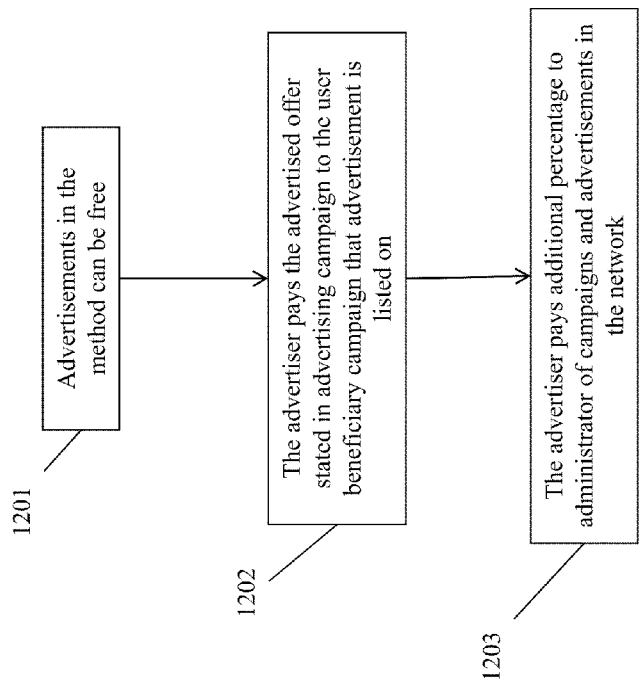
FIG. 12 is a flow chart illustrating the advertising and fee process of the present invention.

The method further provides the use of campaigns for promotion, funding, listing, and fulfillment of intellectual property concepts and business concepts, and includes an advertising creator discount campaign donation function for the purpose of attaching advertising beneficiary donations to sales from an advertising offer, as shown in FIG. 12. Advertisements in the method can be free 1201, but the advertiser pays the advertised offer stated in advertising campaign to the user beneficiary campaign that advertisement is listed on 1202, and pays additional percentage to administrator of campaigns and advertisements in the network 1203.

Figure 13:
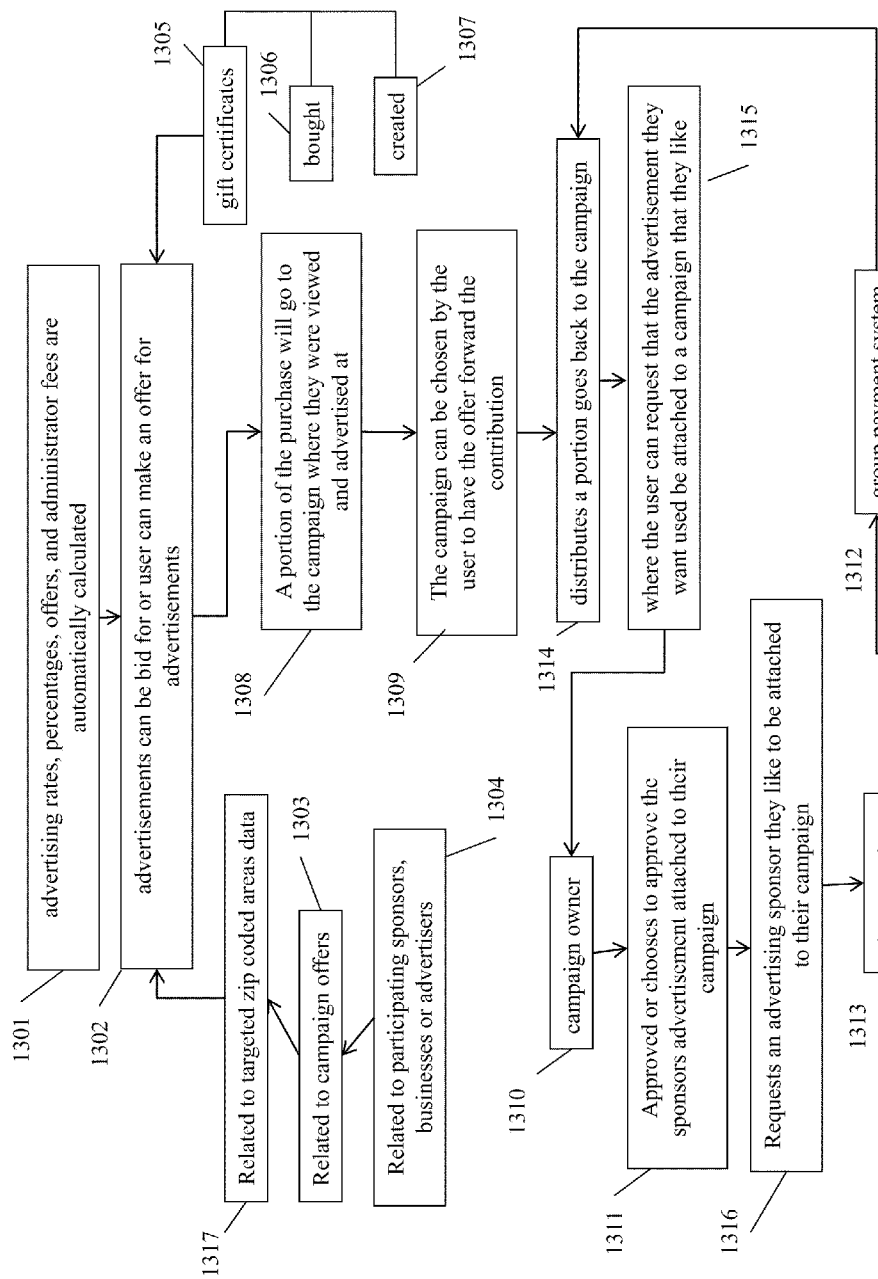
FIG. 13 is a flow chart illustrating the transaction process of the present invention.

Now referring to FIG. 13, advertising rates, percentages, offers, and administrator fees are automatically calculated 1301, and advertisements can be bid for or user can make an offer for advertisement 1302 related to targeted zip coded areas data 1317, as related to campaign offers 1303, and also participating sponsors, businesses or advertisers 1304. Another aspect of the invention provides gift certificates 1305 that can be bought 1306 and created 1307 and a portion of the purchase will go to the campaign where they were viewed and advertised at 1308, or the campaign can be chosen by the user to have the offer forward the contribution through 1309. If the campaign owner 1310 has approved or chooses to approve the sponsors advertisement attached to their campaign 1311, a group payment system 1312 attached to the campaigns 1313, distributes a portion goes back to the campaign 1314 where the user can request that the advertisement they want used, be attached to a campaign that they like 1315, or a campaign owner can request an advertising sponsor they like to be attached to their campaign 1316.

A campaign beneficiary may receive a service, product, or cash incentive, if an advertiser or sponsor receives a purchase or sale. The advertisements used in the method presented here includes at least an offer, such as a campaign promotion, discount, incentive, reward, coupon, gift, cash back, benefit, product, or service. The present invention further provides a system that identifies, and influences a shopper's decision to purchase products based upon data aggregated related to the relationship of a user's, or shopper's campaign, with the shopper's products, services or informational needs and subject to the shopper's liking of the subject, story, images, video, files or sponsors, advertisements of the campaign, and further analysis in the presented method and system is based on transaction data associated with a plurality of users in the method.

The method further includes quantifying the relative value of a campaign for the purpose of reselling the campaign, and includes quantifying the relative value of an advertising campaign for the purpose of reselling the advertisement, and includes quantifying the relative value of collaborative works, for the purpose of reselling the collaborative work, and quantifying the relative value of a user account in a network for the purpose of reselling the user account and can be a protected or unprotected intellectual property that can be bought, sold, bartered, and bid on.

All functions can be used in mobile devices, mobile applications, aircraft displays, used in gaming platforms, and can be used in at least one ATM or standalone kiosk or a plurality of ATM's or kiosks where the incentive can be a ticket, voucher, coupon or prepaid debit card dispensed from an ATM or kiosk with a receipt of a transaction, included with an advertising offer, and where a campaign, offer, and advertising incentives can be displayed on a screen of an ATM or kiosk and can be scanned by a mobile device, with the application installed, or another application with presented script installed to grab the incentive. A mobile tablet pc, computer, and handheld device can run an application that makes it a ATM and kiosk with search connected back to campaigns, and for making deposits, purchases and payments, and also includes where the offers, campaigns, and advertisements can be accessed through another network utilizing a scan able, bar code, or numbered redeemable code.

Figure 14:
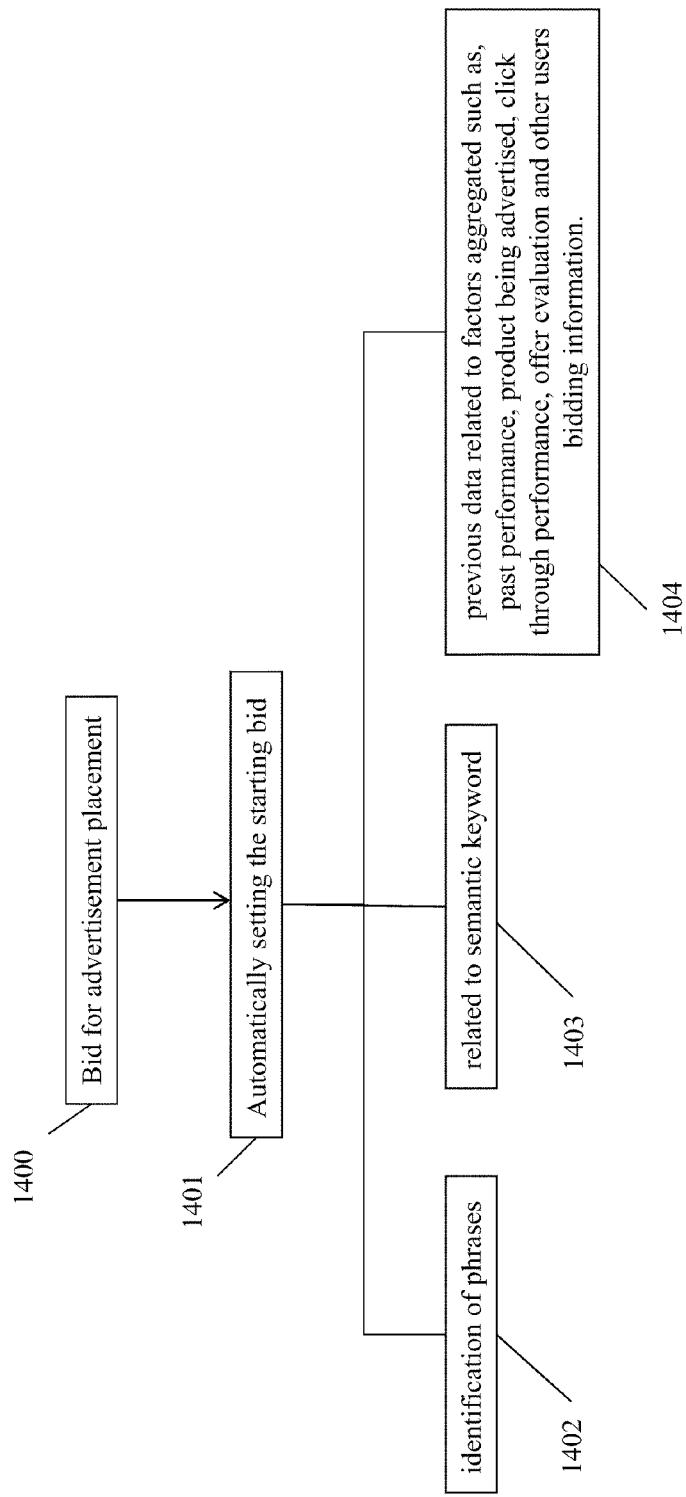
FIG. 14 illustrates the bid for advertisement placement.

Another aspect of the invention is the bid for advertisement placement 1400 in the advertisement network as shown in FIG. 14. The bid for advertisement placement 1400 automatically sets the starting bid 1401, as related to semantic keyword 1402, identification of phrases 1403, and previous data related to factors 1404 aggregated such as, past performance, product being advertised, click through performance, offer evaluation and other users bidding information.

Figure 15:
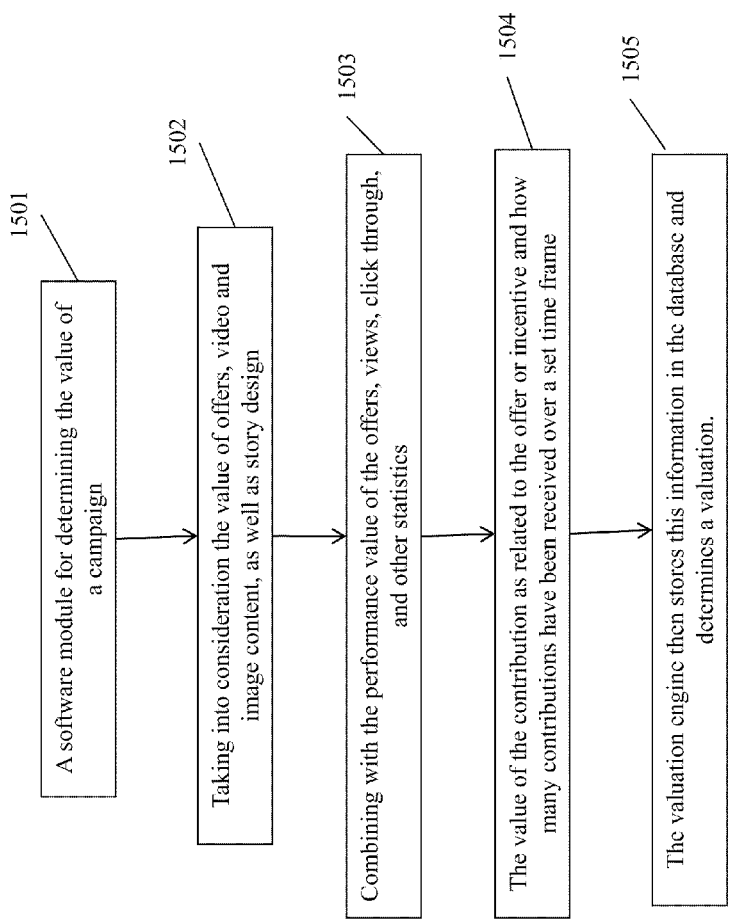
FIG. 15 is a flow chart illustrating the method for determining an incentive value.

Now referring to FIG. 15, the method for determining an incentive value is described. In a first step 1501 a software module for determining the value of a campaign first takes into consideration the value of offers, video and image content, as well as story design 1502. This is then combined with the performance value of the offers, views, click through, and other statistics 1503 and the value of the contribution as related to the offer or incentive and how many contributions have been received over a set time frame 1504. The valuation engine then stores this information in the database 1505 and determines a valuation.

The method of the present invention can also be integrated into a virtual world running on a computer system. A software module is provided for creating virtual vouchers, coupon, rebates, and other discounted transactions with virtual currency. Virtual currency can be given, as a further incentive to promote transactions, and encourage users to spend time in the system, or perform tasks that are beneficial to systems owners, such as clicking on advertisements, making purchases sales and transactions, and using virtual cash and virtual gold, as a reward for uploading content, rating owners of campaigns, and advertisers products and services. Virtual currency can be either virtual cash, virtual credit, or virtual gold.

Figure 16:
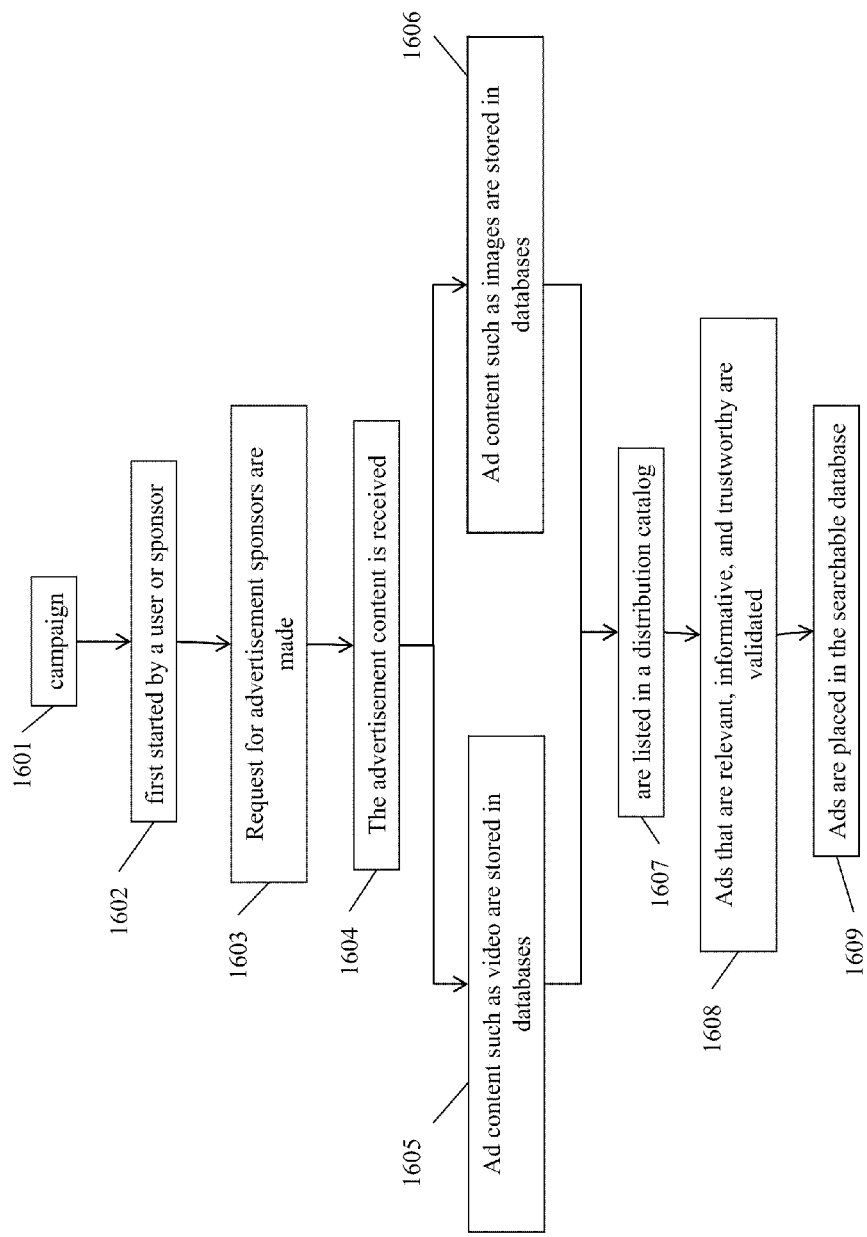
FIG. 16 is a flow chart illustrating the campaign and associated advertiser functions.

Now referring to FIG. 16 a campaign and associated advertiser functions are shown. The campaign 1601 is first started by a user or sponsor 1602. Request for advertisement sponsors are made 1603 and the advertisement content is received 1604. Ad content such as video and images are stored in databases 1605 and 1606 and are listed in a distribution catalog 1607. Ads that are relevant, informative, and trustworthy are validated 1608 and placed in the searchable database 1609.

Figure 17:
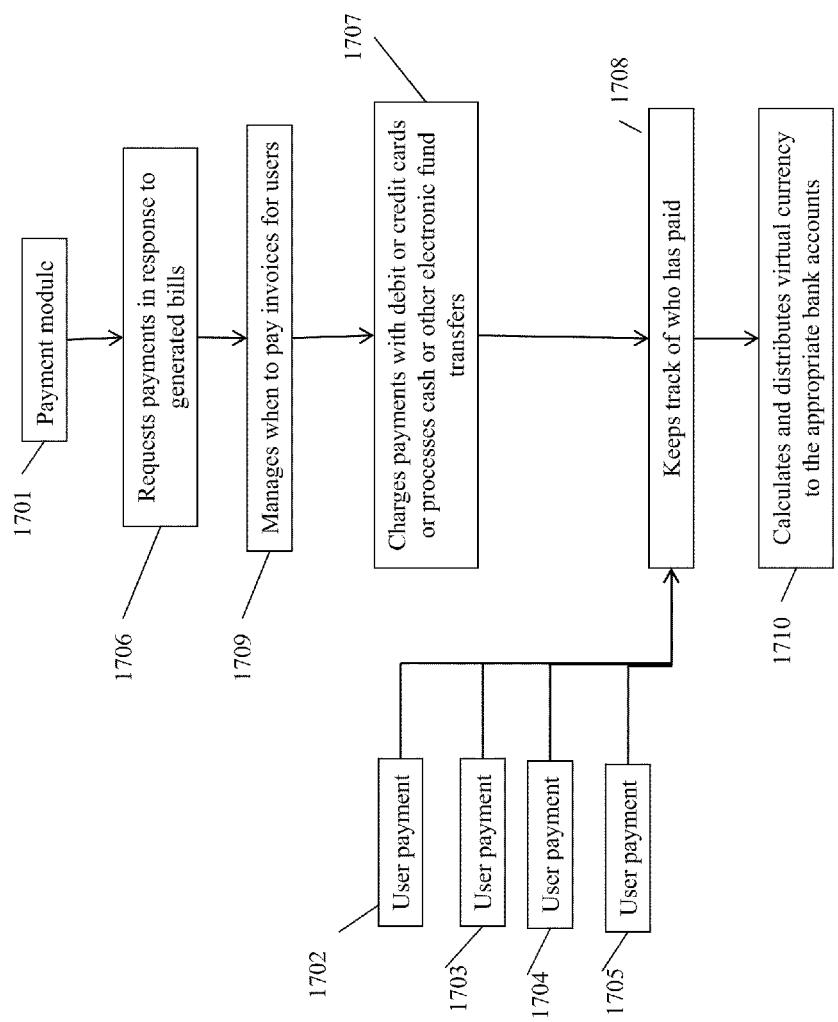
FIG. 17 illustrates the payment module of the present invention.

A payment module 1701, as shown in FIG. 17 the payment module 1701 then requests payments in response to generated bills 1706 and receives payments from one or more users 1702-1705. The payment module 1701 charges payments with debit or credit cards or processes cash or other electronic fund transfers 1707. The payment module 1701 keeps track of who has paid 1708 and manages when to pay invoice for users 1709 as well as calculating and distributing virtual currency to the appropriate bank accounts 1710.

Figure 18:
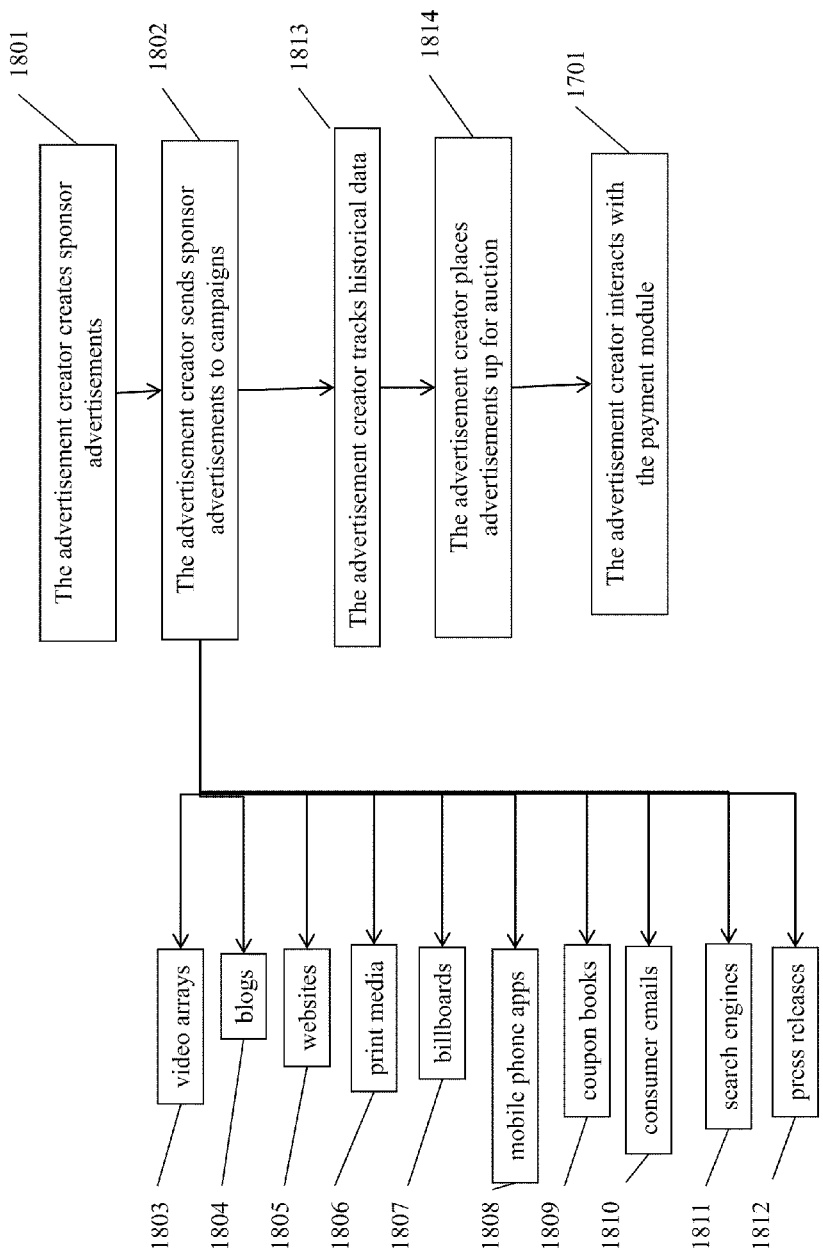
FIG. 18 illustrates the advertisement creator module of the present invention.

Now referring to FIG. 18, one embodiment of the advertisement creator module is shown. In this embodiment, the advertisement creator creates sponsor advertisements 1801 and sends them to campaigns 1802, video arrays 1803, blogs 1804, websites 1805, print media 1806, billboards 1807, mobile phone apps 1808, coupon books, 1809, consumer emails 1810, search engines 1811, and press releases 1812. The advertisement creator module 1801 can also track historical data 1813, places advertisements up for auction 1814, and interact with the payment module 1701.

Figure 20:
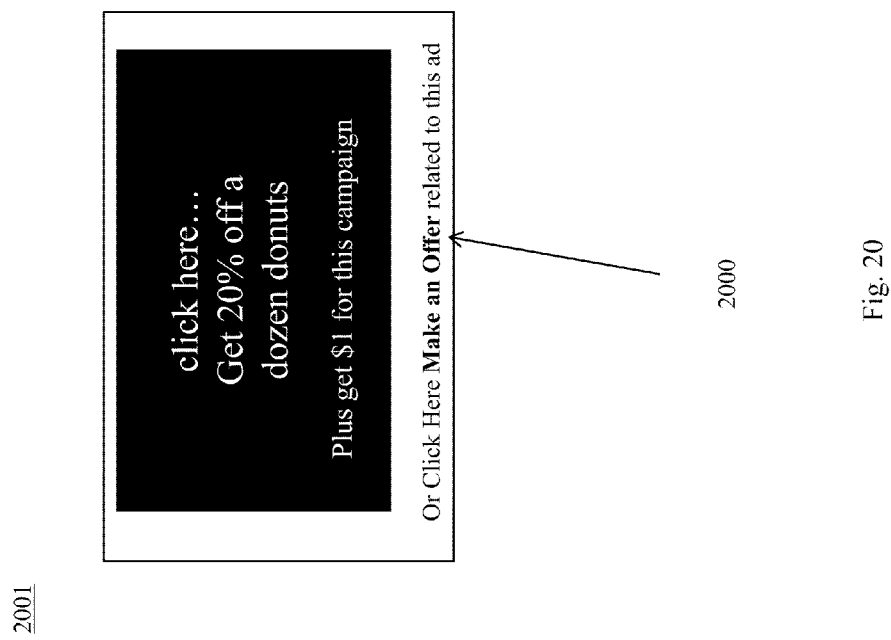
FIG. 20 illustrates an example advertisement and requirements.
Figure 21:
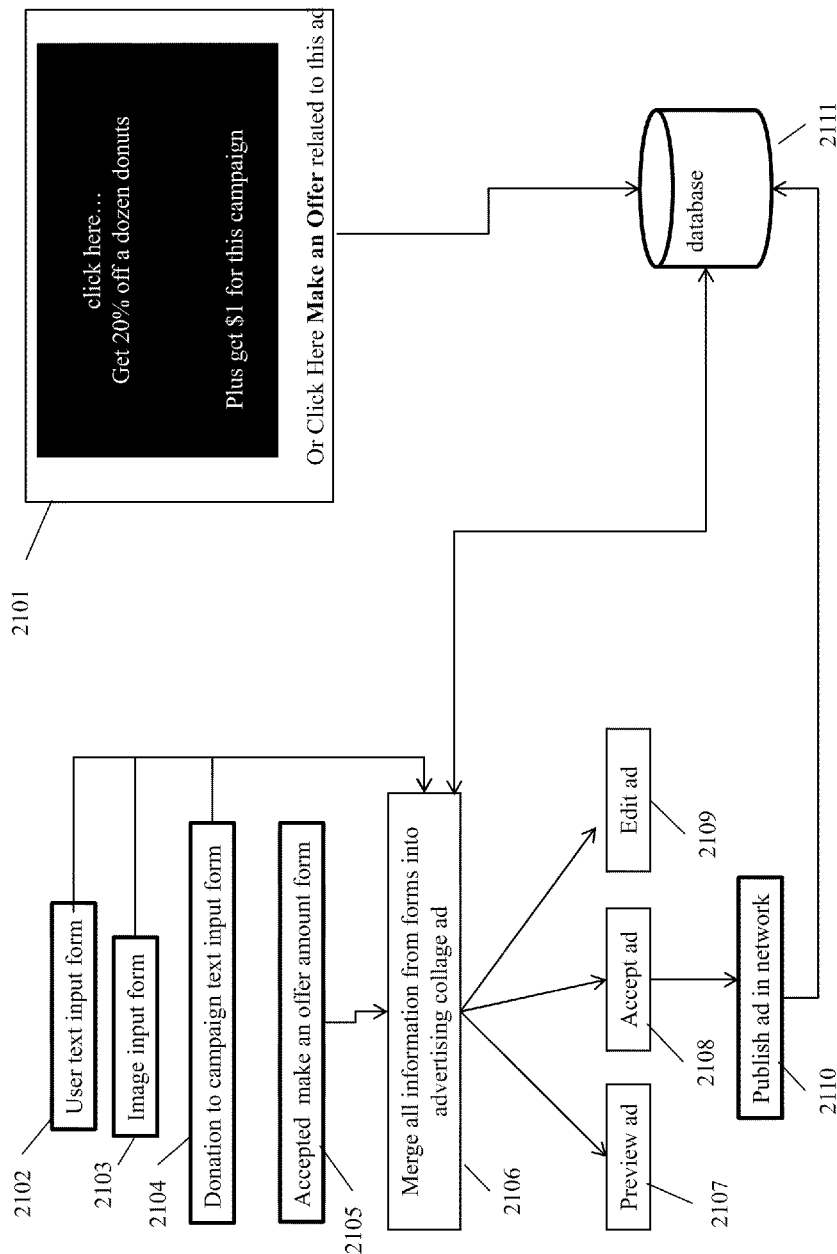
FIG. 21 illustrates the process of creating the advertisement or offer.

FIGS. 20-21 illustrate an example of the method and process for registration, creation and management of campaigns and advertisements in a network system. In this example one or more people are trying to raise money for a party. As shown in FIG. 20, the person establishing the campaign first uses the make an office module method 2000 to create an advertisement 2001 that offers a coupon that when redeemed generates revenue for the campaign. In this example, a person using the coupon would receive 20% off a dozen donuts and through that use generate $1 toward the campaign goal. The advertisement contains text related to the amount being donated as well as the offer.

FIG. 21 illustrates the process of creating the advertisement or offer 2101. A user first inputs text 2102, images 2103, donation parameters 2104, and offer parameters 2105 where are then merged 2106 to generate a preview ad 2107 which can then be accepted 2108 or edited 2109. Upon acceptance the ad is published in the network 2110 and stored in a database 2111.

Moreover, other implementations of the invention will be apparent to those skilled in the art from consideration of the specification and practice of the invention disclosed herein. Various aspects and components of the described embodiments may be used singly or in any combination in the computerized content filtering system. It is intended that the specification and examples be considered as exemplary only, with a true scope and spirit of the invention being indicated by the following claims.

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The embodiments of the invention in which an exclusive property or privilege is claimed are defined as follows:

1. A method for executing a series of instructions on a computer system, the method comprising:
   registering a user account in a computer system;
   generating one or more bar codes, and QR codes attached to the registered users account;
   generating one or more bar codes attached to the registered users account;
   generating, using the computer system, graphical representations of users or users entities attached to the registered users account;
   creating and attaching human keys to the registered users account; creating and attaching bank accounts to the registered users account;
   creating and attaching automatic additional registrations to one or more websites to the registered users account;
   creating and attaching opted in automatic registration to other registration systems;
   creating and attaching advertising management and creation accounts to the registered users account;
   creating and storing campaigns, advertisements, and media in a database;
   offering free advertisement placements;
   creating one or more campaign accounts by a user;
   uploading and storing images related to campaigns, advertisements and media, for user viewing and that can be read by an optical scanner to determine ownership, information, offers and valuations;
   uploading and storing images that can be read by an optical scanner for information after a registration process;
   receiving donations, contributions, or funds deposited into a campaign account;
   allowing a user to manage the created campaign;
   raising a target designated specified amount; and
   allowing the user, up to a designated specified amount, to use a defined amount from the campaign bank account for additional promotions and services for their campaign from inside or outside designated vendors approved by the method administrators.

2. The method of claim 1 further comprising the steps of:
   issuing and providing one or more instances of credit cards, debit cards, coupons, and vouchers for the purpose of enabling the user to make transactions; and
   attaching debit and credit cards to cash discounts, whereby when a credit card or debit card is used the discount is applied to the transaction.

3. The method of claim 1 further comprising the steps of providing an advertising management account for:
   taking customer orders from links in customer's advertisements;
   uploading advertisement images;
   uploading text and information to an advertisement creator system;
   enabling protection of intellectual property that is uploaded;
   tracking views and clicks from offers and incentives within advertisements;
   enabling advertisements to be associated with campaigns;
   offering free advertisement placements when a user creates or uploads advertisements, that states in the advertisement clearly a stated offer displayed on the advertisement;
   providing free advertisements when an advertiser makes a contribution to a campaign its linked to and states what that contribution will be in the advertisement; and
   defining the portion that will go to the campaign if and when there is a redemption of the advertiser offer in the advertisement.

4. The method of claim 1 further comprising the steps of:
   attaching a group payment system to a campaign;
   processing a transaction resulting from an advertisement;
   distributing a portion of cash or virtual cash proceeds from advertising that goes back to the campaign;
   connecting one or more QR codes for tracking and reporting redemptions of fulfilled advertisement purchases and portions of the sales earned to the group payment system; and
   depositing earned portions directly to the campaign bank account by the group payment system.

5. The method of claim 1 further comprising the steps of:
   creating QR codes by a QR code module when a user registers;
   creating QR codes when a user creates or uploads an advertisement to the system;
   creating QR CODES when a user creates a campaign in the system;
   decoding embedded scanable data in the QR code attached to users, advertisements, and campaigns;
   changing embedded scanable data in the QR code;
   passing along a QR Code from a distributing user to one or more other recipient users;
   de-encrypting the passed QR code by recipient users;
   connecting the recipient users to the advertisement, campaign, or information;
   rewarding a distributing user for passing the QR code along to an advertiser specified amount of users; and
   attaching a human key to a QR code.

6. The method of claim 1 further comprising the steps of:
   offering paid advertisement placements;
   aggregating and placing advertisements with a relationship to zip code, postal codes, spatial point information, for international and national location based advertising fulfillment and use;

enabling static and variable incentives in advertisements related to the ability of the advertiser to change incentives at any time in the advertisement; and enabling an automated machine advertisement creator.

7. The method of claim 1 further comprising the steps of:

providing an upload function that captures images, audio, and text;

assembling the captured image, audio, and text together in a collage of a representation;

converting to speech for creating collages of campaigns and advertisements; and attaching a human key or QR code to the collage.

8. The method of claim 1 further comprising the steps of:

providing a valuation for an actual offer in an advertisement aggregated from information obtained during the creation of the advertisement in the method;

tracking the performance of the advertisement for additional valuation purposes;

bidding or making an offer for a better incentive by users; and discounting in an advertisement utilizing a make an offer module.

9. The method of claim 1 further comprising the steps of:

matching contributions by other users and sponsors combined with advertisements incentives and campaign donations; and calculating, displaying, or suggesting advertising rates, percentages, offers and administrator fees, at the time of advertising creation.

10. The method of claim 1 further comprising the step of:

bidding for advertisement placement as related to targeted zip code or postal code information, the type of campaign, the advertising offer, participating sponsors, and advertisers.

11. The method of claim 1 further comprising the step of:

providing gift certificates for individual or a plurality of individuals.

12. The method of claim 1 further comprising the step of:

linking one or more cards and one or more written or printed offers to advertisements that can be uploaded or created to the gift certificates where a specified portion of the purchase of the advertised gift certificates will go to the campaign where the gift certificate advertisement was advertised on at the time of fulfillment and purchase.

13. The method of claim 1 further comprising the step of:

selecting an advertisements to go into a shopping cart to make an immediate purchase; and locking in an offer displayed in the advertisement selected.

14. The method of claim 1 further comprising the steps of:

providing a campaign management and creator;

providing discounts and searching for discounts on other campaigns within networks and outside networks;

appraising a campaign or advertisement, for the purpose of valuation, bartering or selling the campaign or advertisement; and tagging or linking traffic, advertisements, or resources from, one campaign to another campaign.

15. The method of claim 1 further comprising the step of:

creating a campaign for the purpose of raising funds used as an investment in another campaign.

16. The method of claim 1 further comprising the steps of:

managing a search engine to search relationships between campaigns, advertiser incentives in advertisements, and contributions in advertisements for each campaign.

17. The method of claim 1 further comprising the steps of:

searching campaigns as related to advertisements and QR code incentives;

searching for a product or service;

determining what campaigns will benefit from a purchase;

determining what QR code offers are related to the campaign and the advertisement; and determining what the QR Code pass along benefit will be if the user passes the QR Code off to other users.

18. The method of claim 1 further comprising the step of enabling campaign beneficiaries to receive a single or plurality of services, products, or cash incentives if an advertiser gets a completed sale of a products, services, tangible or intangible objects.

19. The method of claim 1 further comprising the step of placing a plurality of sponsors advertisers and media on campaigns when they are started.

20. The method of claim 1 further comprising creating and attaching virtual bank accounts to the registered users account;

setting the value for a first virtual currency, and the conversion rate to a second virtual currency; and including either a first or second virtual currency as an incentive tool in advertisements and campaigns; and trading virtual currencies for tangible and intangible property products and services.

* * * * *